(12) United States Patent
Mårtensson

(10) Patent No.: US 6,397,547 B1
(45) Date of Patent: *Jun. 4, 2002

(54) FLOORING PANEL OR WALL PANEL AND USE THEREOF

(75) Inventor: Göran Mårtensson, Klagstorp (SE)

(73) Assignee: Pergo, AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/637,036

(22) Filed: Aug. 10, 2000

Related U.S. Application Data

(63) Continuation of application No. 08/894,966, filed on Aug. 28, 1997, now Pat. No. 6,101,778.

(30) Foreign Application Priority Data

Mar. 7, 1995 (SE) ................................................ 9500810

(51) Int. Cl.[7] .................................................. E04B 1/38
(52) U.S. Cl. ...................... 52/582.1; 52/591.1; 52/592.1
(58) Field of Search .......................... 52/582.1, 586.1, 52/591.1, 591.3, 591.4, 592.1, 592.2

(56) References Cited

U.S. PATENT DOCUMENTS

| | | | | |
|---|---|---|---|---|
| 2,004,193 A | * | 6/1935 | Cherry | |
| 3,535,844 A | * | 10/1970 | Glaros | |
| 3,798,111 A | | 3/1974 | Lane et al. | |
| 3,807,113 A | * | 4/1974 | Turner | |
| 4,426,820 A | | 1/1984 | Terbrack et al. | |
| 4,940,503 A | | 7/1990 | Lindgren et al. | |
| 5,216,861 A | | 6/1993 | Meyerson | |
| 5,295,341 A | | 3/1994 | Kajiwara | |
| 5,325,649 A | * | 7/1994 | Kajiwara | |
| 5,344,700 A | * | 9/1994 | McGath et al. | |
| 5,502,939 A | * | 4/1996 | Zadok et al. | |
| 5,706,621 A | | 1/1998 | Pervan | |
| 5,797,237 A | | 8/1998 | Finkell, Jr. | |
| 5,860,267 A | | 1/1999 | Pervan | |
| 6,006,486 A | | 12/1999 | Moriau et al. | |
| 6,023,907 A | | 2/2000 | Pervan | |
| 6,101,778 A | * | 8/2000 | Mårtensson | 52/582.1 |
| 6,182,410 B1 | | 2/2001 | Pervan | |

FOREIGN PATENT DOCUMENTS

| | | |
|---|---|---|
| BE | 10104887 | 10/1998 |
| GB | 1348272 | 3/1974 |
| GB | 1430423 | 9/1976 |
| GB | 2256023 | 11/1992 |

* cited by examiner

Primary Examiner—Carl D. Friedman
Assistant Examiner—Brian E. Glessner
(74) Attorney, Agent, or Firm—Stevens, Davis, Miller & Mosher, L.L.P.

(57) ABSTRACT

Flooring panel or wall panel and a use thereof in a wet room. The panel is provided with locking elements in the form of groove (6) and tongue (7) forming a tongue/groove joint for assembling of the panels. The groove (6) and the tongue (7) are made of water tight material and formed with a snap-together joint.

44 Claims, 1 Drawing Sheet

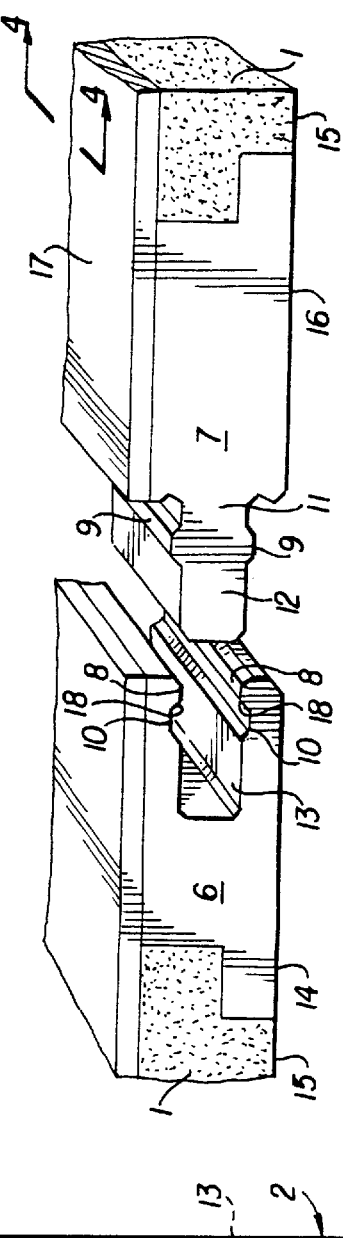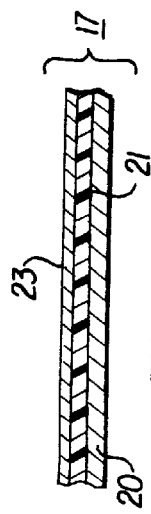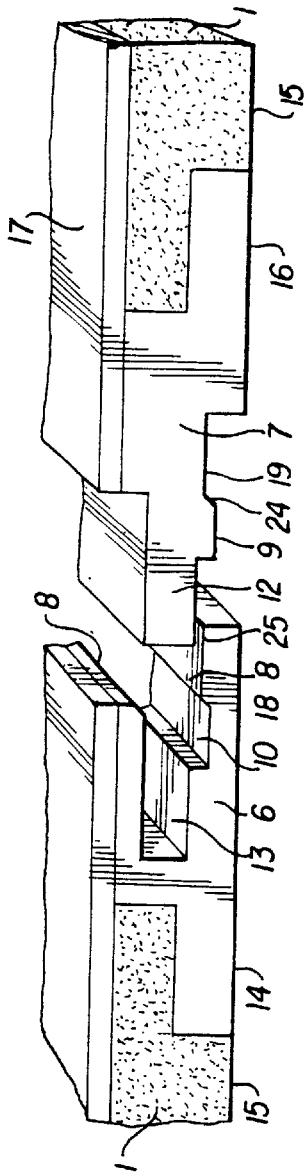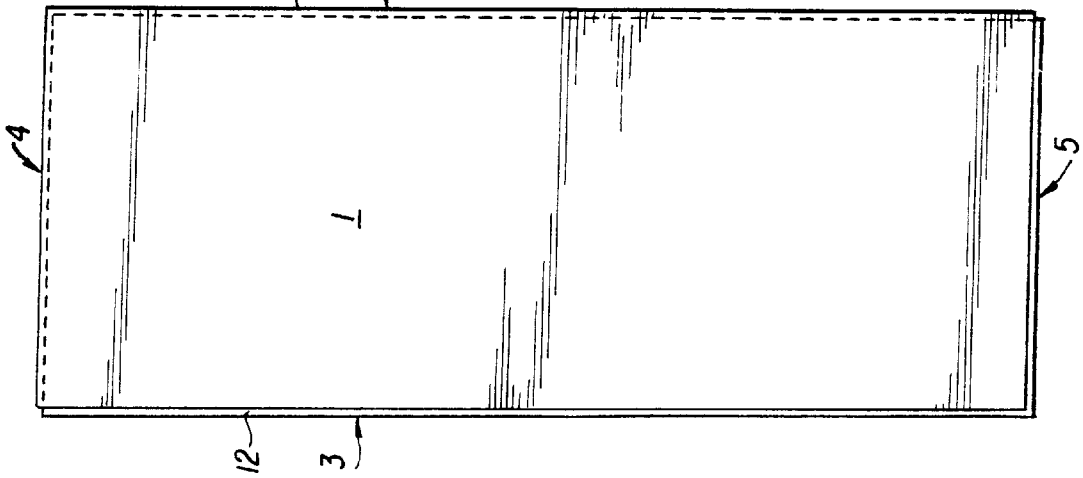

FLOORING PANEL OR WALL PANEL AND USE THEREOF

This application is a continuation of U.S. patent application Ser. No. 08/894,966, filed Aug. 28, 1997, now U.S. Pat. No. 6,101,778, incorporated herein by reference.

BACKGROUND OF THE INVENTION

The present invention relates to a flooring panel or wall panel and the use thereof in a wet room.

DESCRIPTION OF THE PRIOR ART

During the last few years laminated floors have achieved and increased popularity and on many markets they are beginning to replace parquet floors and wall-to-wall carpets. At the production of laminated floors a decorative thermosetting laminate is first produced. This laminate usually consists of a base layer of paper sheets impregnated with phenol-formaldehyde resin and a decorative surface layer consisting of a decor paper sheet impregnated with melamine-formaldehyde resin. The laminate is produced by pressing the different layers at a high pressure and an increased temperature.

The laminate obtained is then glued to a carrier of particle board for instance or used as such without any carrier and it is then called compact laminate. The laminated panel thus produced is then sawn up to a number of floor boards which are provided with groove and tongue at the long sides and the short sides. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance.

At the assemblage of such a flooring glue is normally applied in the groove when the floor boards are assembled. Therefore, it will be difficult to change a damaged board or to remove a whole flooring and for instance install it in another room.

To avoid the above problem efforts have been made to achieve floor boards which can be assembled without glue. One such construction is disclosed in the U.S. Pat. No. 5,295,341. There the boards are provided with groove and tongue in the usual way, but here a snap-together system is included in the groove-tongue joint.

These floor boards can be assembled without glue. However, they have the disadvantage that the joints between the boards will be flexible and not rigid. This means that if the surface below the floor boards is not completely even which is usually the case, a gap will be formed between the boards. In these gaps dirt and water can penetrate.

SUMMARY OF THE INVENTION

According to the present invention also the last mentioned problem has been solved and a flooring panel or wall panel, preferably of thermosetting laminate having two pairs of parallel side edges has been brought about. Two of these side edges are provided with a locking means in the form of a groove and the other two with a tongue fitting in the groove whereby a tongue/groove joint for assembling of the panels is formed. The groove and the tongue are made of a water tight material and formed with a snap-together joint including one or more snapping webs or the like with corresponding cooperating snapping grooves. The groove in front of the snap-together joint has an entrance opening and continues inside the snap-together joint in a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained.

BRIEF DESCRIPTION OF THE DRAWINGS

FIG. 1 schematically shows a panel according to the invention seen from above;

FIG. 2 shows a cross section through two adjacent edges of two panels according to the invention wherein the two such panels are to be assembled; and FIG. 3 shows a cross section through two adjacent edges of a second embodiment of a panel where two such panels are to be assembled.

FIG. 4 is a schematic representation of the decorative thermosetting laminate as a surface layer 17 of FIGS. 2 or 3.

DESCRIPTION OF THE PREFERRED EMBODIMENTS

According to one preferred embodiment two adjacent side edges of the panel are provided with a groove and the other two side edges with a tongue. At this embodiment the panel is usually rectangular, but it can also be square.

At square panels it is also possible to provide a pair of parallel sides with a groove and the other pair with a tongue. However, the choice of pattern on the surface layer of the panel is limited at this shape.

It is preferred that the groove and the tongue are made of thermoplastic, a thermosetting laminate, aluminum or a chipboard or particle board impregnated with a thermoplastic. Of course also other water tight materials can be used.

At one embodiment, the groove as well as the tongue are formed as a ledge fixed to the side edges of the panel. Suitably the ledge-formed groove and tongue respectively are then fixed in a recess along the side edges with glue for instance.

The snapping webs can be formed on the upper and/or lower side of the tongue while fitting snapping grooves are formed in the groove.

In one preferred embodiment one snapping web is formed on the upper side of the tongue and one on the lower side thereof while the groove has two fitting snapping grooves one at the top and one at the bottom.

If necessary one pair of snapping webs can be formed on the upper side of the tongue and one pair on the lower side thereof. Of course you then need two snapping grooves at the top and two snapping grooves at the bottom of the groove to fit with the snapping webs. This construction will give an extremely strong joint.

Of course the snapping webs can instead be arranged in the groove and the snapping grooves on the tongue.

In one preferred embodiment the width of the stabilizing part is 2–10 mm, preferably 4–10 mm. Generally a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels. Of course without any substantial gap between the panels water and dirt are prevented from entering the assembled flooring or wall covering.

As a safe guard against water penetration a seal might be arranged in the inner part of the stabilizing groove for instance.

Preferably the grooves and the tongues run the full length of the side edges of the panels.

The panels can be designed in such a manner that the under side of the groove and the tongue are situated in the same level as the under side of the panel.

The panels can be used for covering floors and walls in ordinary dry rooms. However, due to the rigid and water tight joints the panels can be used also for wet rooms. For such applications the whole panel is preferably made of thermosetting laminate of so-called compact laminate type. Such a laminate does not absorb water.

Another alternative is a non water absorbing base with a water tight surface. The surface may for instance consist of paint, a thermoplastic foil such as polyethylene, polypropylene or polyvinyl chloride, a paper sheet impregnated with thermosetting resin or of a thermosetting laminate, One suitable non water absorbing base is a board produced by pressing wood particles or wood chips impregnated with a thermoplastic.

The invention will be further explained in connection with the enclosed figures of which FIG. 1 schematically shows a panel I according to the invention seen from above. The panel is drawn with a rectangular shape but it can as well be square. FIGS. 2 and 3 show a cross section through two adjacent edges of two embodiments of a panel where two such panels are to be assembled. The construction according to FIG. 2 is preferred.

The panel 1 consists of a base of wood particles impregnated with a thermoplastic with a decorative thermosetting laminate as a surface layer 17 glued on top.

As disclosed above, and as illustrated in FIG. 4, the decorative thermosetting laminate as a surface layer 17 usually consists of a base layer of paper sheets 20, 21 impregnated with a resin and a decorative surface layer 23 comprising a decor paper impregnated with a resin.

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap-together joint. In the embodiment shown in FIG. 2 the snap-together joint consists of two snapping webs 9, one on the upper side of the tongue 7 and one on the lower side of tongue, these webs 9 cooperating with two fitting snapping grooves 10.

In front of the snap-together joint, which means the snapping webs 9 and the snapping groove 10, the groove 6 has an entrance opening 8. Inside the snap-together joint the groove 6 continues in a stabilizing groove 13.

The tongue 7 is formed with a rear neck 11 intended to fit in the entrance opening 8 of the groove 6. In front of the snap-together joint the tongue 7 has a forwardly protruding stabilizing part 12 intended for a tight fit in the stabilizing groove 13.

The parts 9 and 10 included in the snap-together joint are also adapted to each other to give a tight fit and strong joint. To increase this effect further the snapping grooves 10 are provided with undercut edges 18 which cooperate with the backside of the snapping webs 9 with the same undercut.

The groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1.

When connecting panels have been assembled by the snap-together joints and the stabilizing parts 12 inserted in the stabilizing grooves 13, the panels are fixed to each other and prevented from unintentional separation. A rigid floor covering or wall covering with water tight joints and without unintentional gaps between the panels is obtained. The usual rotation of the snapping webs 9 in the snapping grooves 10 is prevented by the stabilizing parts 12 in the stabilizing grooves 13 Accordingly these parts are essential for the possibility to get a rigid joint between the panels.

The embodiment shown in FIG. 3 is very similar to that according to FIG. 2. The difference is that only the under side of the tongue 7 is provided with a snapping web 9. The upper side is lacking a snapping web. Accordingly there is only one snapping groove 10 at the bottom of the groove 6.

As shown in FIG. 3, the shape of tongue 7 defines a snapping groove 19 on the underside of tongue 7, the snapping groove 19 having an undercut, tapering surface 24 which cooperates with undercut edge 18 of snapping web 25.

The invention is not limited to the embodiments shown since these can be modified in different ways within the scope of the invention.

I claim:

1. A glueless laminated flooring system comprising
   a plurality of similar flooring panels to be assembled without glue, each of said panels comprising a surface of a thermosetting laminate as a paper sheet impregnated with thermosetting resin;
   said surface being bonded to a carrier;
   each of said panels comprising two sets of parallel side edges;
   each of said side edges configured to receive at least one of a groove or a tongue;
   said tongue and said groove being formed of at least one material selected for the group consisting of chipboard and particle board, and at least one of said tongue or groove further includes least one snapping web positioned thereon, and,
   said tongue and said groove of each of said panels being shaped so as to form a tight floor joint when snapped together with a similar panel.

2. The glueless laminated flooring system of claim 1, wherein said thermosetting laminate comprises a base layer of paper sheets impregnated with a thermosetting resin and a decorative surface layer.

3. The glueless laminated flooring system of claim 2, wherein the thermosetting resin is at least one of phenol-formaldehyde resin and melamine-formaldehyde resin.

4. The glueless laminated flooring system of claim 1, wherein the tongue and groove of each of said panels comprises undercut surfaces which taper from vertical in a direction so as to force the panels toward the joint between said panels to form said tight joint.

5. The glueless laminated flooring system of claim 1, wherein said tongue further comprises at least two snapping webs.

6. The glueless laminated flooring system of claim 5, wherein said tongue comprises two snapping webs.

7. The glueless laminated flooring system of claim 6, wherein said tongue has at least two faces and at least one respective snapping web is positioned on each respective face of said tongue.

8. The glueless laminated flooring system of claim 1, wherein said groove further comprises at least one snapping groove.

9. The glueless laminated flooring system of claim 8, wherein said groove comprises two snapping grooves.

10. The glueless laminated flooring system of claim 1, wherein panels are rectangular in shape.

11. The glueless flooring system of claim 1, wherein rotation of assembled panels about said joint between assembled panels is prevented by the penetration of a stabilizing portion of said tongue into a stabilizing groove, each of said stabilizing portion of said tongue and said stabilizing groove having opposed, parallel surfaces.

12. The glueless flooring system of claim 1, wherein said joint between adjacent panels is rigid.

13. The glueless flooring system of claim 1, wherein said snapped together panels comprise a thermosetting laminate and form a water tight joint.

14. The glueless laminated flooring system of claim 1, wherein at least said side edge of the panel defining said groove is made of a material selected from the group consisting of chipboard and particle board, each impregnated with a resin.

15. The glueless laminated flooring system of claim 1, wherein at least said side edge of the panel defining said tongue is made of a material selected from the group consisting of chipboard and particle board, each impregnated with a resin.

16. The glueless laminated flooring system of claim 1, further comprising a base formed of pressed wood material selected from the group consisting of wood particles and wood chips, each impregnated with a resin.

17. The flooring panel of claim 14, further comprising a base formed of pressed wood material selected from the group consisting of wood particles and wood chips, each impregnated with a resin.

18. The flooring panel of claim 15, further comprising a base formed of pressed wood material selected from the group consisting of wood particles and wood chips, each impregnated with a resin.

19. A method of assembling a glueless laminated flooring having a tight joint between abutting floor panels, said method comprising
joining a plurality of similar flooring panels, each of said panels comprising a surface of a thermosetting laminate or a paper sheet impregnated with thermosetting resin; said surface being bonded to a carrier; said panels comprising two sets of parallel side edges; two of said side edges comprising a groove and two of said side edges comprising a tongue; said tongue and said groove being formed of at least one material selected from the group consisting of chipboard and particle board and being shaped so as to form a tight floor joint when snapped together.

20. The method of claim 19, wherein said panels are assembled by pushing two similar panels towards one another and snapping the panels together.

21. A flooring panel for use in assembling a glueless floor, said flooring panel comprising
a surface of a thermosetting laminate or a paper impregnated with a thermosetting resin said surface being bonded to a carrier of wood particles impregnated with a plastic;
said panel comprising two sets of parallel side edges;
two of said side edges comprising a groove and two of said side edges comprising a tongue;
at least said tongue being formed of as a material selected from the group consisting of;
a chipboard and a particle board, and the tongue and groove being cooperatively shaped so as to form a tight floor joint in the absence of glue when snapped together with a similar panel.

22. The flooring panel of claim 21, wherein said tongue comprises at least one snapping groove having a surface which is undercut so as to cooperate with a similar undercut on a backside of a snapping web positioned in said groove when the flooring panel is assembled with another, similar, flooring panel.

23. The flooring panel of claim 21, wherein said bonded wood particles is made of a material selected from the group consisting of chipboard and particle board, each impregnated with a resin.

24. The flooring panel of claim 21, wherein said bonded wood particles is made of a material comprising particle board impregnated with a resin.

25. The flooring panel of claim 21, further comprising a base formed of at least one of wood particles and wood chips, each impregnated with a resin.

26. The flooring panel of claim 23, further comprising a base formed of at least one of wood particles and wood chips, each impregnated with a resin.

27. The flooring panel of claim 24, further comprising a base formed of wood particles impregnated with a resin.

28. The flooring panel of claim 22, wherein said undercut on said at least one snapping groove defines a tapering surface which cooperates with said undercut on said snapping web.

29. A glueless panel system comprising
a plurality of similar panels to be assembled without glue, each of said panels comprising
a surface layer selected from the group consisting of paint,
a thermoplastic foil,
a paper impregnated with thermosetting resin and
a thermosetting laminate;
each of said panels comprising two sets of parallel side edges,
two of said side edges comprising a groove and two of said side edges comprising a tongue;
said tongue being a unitary, monolithic structure formed of bonded wood particles having a length extending substantially the length of said panel, and at least one snapping web formed thereon,
and said groove of each of said panels having snapping grooves therein, and being shaped so as to receive said tongue and the at least one snapping web, thereby forming a water tight joint when snapped together with a similar panel, said joint substantially preventing moisture from passing through a joint formed between assembled similar panels.

30. The panel system of claim 29 wherein said tongue comprises two snapping webs.

31. The panel system of claim 29 wherein the panels are flooring panels.

32. A panel for use with other similar panels to be assembled by snapping one panel to another similar panel in the absence of glue; said panel having
- a surface layer selected from the group consisting of
  - paint,
  - a thermoplastic foil,
  - a paper impregnated with thermosetting resin, and
  - a thermosetting laminate;
- said panel comprising two sets of parallel side edges; two of said side edges comprising a groove and two of said side edges comprising a tongue;
- said tongue being a unitary, monolithic structure formed of bonded wood particles having a rear neck configured to tightly fit within an entrance opening of a respective groove, and a forwardly-protruding stabilizing part separated from the neck by at least one snapping web positioned on the tongue, the stabilizing part and the neck being substantially parallel to the first surface; and
- said groove being shaped with at least one snapping groove, each configured and positioned so as to receive a respective snapping web, and to thereby form a tight joint when snapped together with a similar panel.

33. The panel of claim 32 wherein said tongue comprises two snapping webs.

34. The panel of claim 32 wherein the panel is a flooring panel.

35. A method of assembling a glueless panel system having
- a tight joint between abutting panels, said method comprising the steps of
- providing a plurality of similar panels,
- each of said panels comprising a surface layer selected from the group consisting of paint, a thermoplastic foil, a paper impregnated with thermosetting resin and a thermosetting laminate;
- configuring said panels with two sets of parallel side edges;
- configuring one of a groove or a tongue on each said edge;
- selecting each of the tongue and groove to comprise bonded wood particles;
- forming the tongue to have a neck portion configured to extend from a respective edge, and a stabilizing part distal the edge, each of the neck and the stabilizing part having walls extending substantially orthogonal to the respective edge;
- positioning at least one snapping web between the neck and the stabilizing part;
- forming at least one snapping groove within the groove;
- shaping each of the said tongue and groove so as to form a tight joint;
- joining the panels together by snapping the tongue into the groove.

36. The method of claim 35 wherein said tongue comprises two snapping webs.

37. The method of claim 35 wherein the panels are flooring panels.

38. A panel with two pairs of parallel side edges, the panel comprising:
- one pair of side edges having a locking means that includes a groove having a lower groove definition and an upper groove definition, and
- the other pair of side edges having a tongue configured to fit into the groove, thereby forming a tongue and groove joint for joining the panels; and,
- at least one snap action projection configured on at least one of an upper side or bottom side of the tongue, and at least one snap action groove are formed within the groove, such that the snap action projections and the snap action grooves are cooperatively configured to snugly engage one another when the panels are in an installed position; wherein,
- the panels, when in the installed position, are joined together by the snap action joint, and are secured to one another and prevented from becoming separated from one another, while simultaneously maintaining a fixed covering without undesired space between adjacent panels; and wherein
- the bottom side of the tongue has a snap-action rib; and wherein,
- the lower groove definition has a snap action groove formed to receive the snap-action rib; and wherein,
- the lower groove definition is longer than the upper groove definition, such that the lower groove definition protrudes over the upper groove definition at a corresponding side edge of the panel.

39. The panel as in claim 38, wherein the panel is one of a flooring panel or a wall panel.

40. The panel as in claim 38, further comprising
- a water-resistant base including the grooves and tongues, includes a board which is formed of compressed wood parts or wood chips; and,
- a water-resistant surface layer including at least one of a paint, thermoplastic sheeting, a layer of paper impregnated with cured resin, or a cured laminate.

41. The panel as in claim 40, wherein the snap-action groove is positioned in the lower groove definition so as to be fully situated in the groove portion within the upper groove definition.

42. The panel as set forth in claim 40, wherein at least one snap action projection faces the lower groove definition, and, a snap-action groove formed to receive said snap-action projection bears an inclined edge surface.

43. The panel as set forth in claim 42, wherein the inclined edge surface have outer contact surfaces which face the side edge of the panel.

44. The panel as set forth in claim 38, wherein the lower side of the tongue is substantially coplanar with a lower side of the panel.

* * * * *

UNITED STATES PATENT AND TRADEMARK OFFICE
CERTIFICATE OF CORRECTION

PATENT NO.    : 6,397,547 B1
DATED         : June 4, 2002
INVENTOR(S)   : Goran Martensson It is certified that error appears in the above-identified patent and that said Letters Patent is hereby corrected as shown below:

Title page,
Item [63], the following data should be inserted after Patent No. 6,101,778 - "which was a 371 National Stage of PCT/SE96/00256, filed February 29, 1996."

Drawings,
Fig. 3, the omitted lead line for the element denoted by numeral "18" has been added as follows:

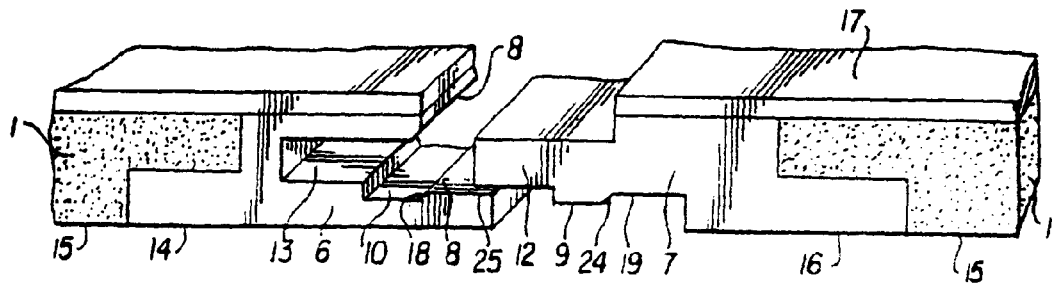

Signed and Sealed this

Fourth Day of February, 2003

JAMES E. ROGAN
*Director of the United States Patent and Trademark Office*